(12) United States Patent
Kaneshige et al.

(10) Patent No.: US 9,490,686 B2
(45) Date of Patent: Nov. 8, 2016

(54) LINEAR MOTOR WITH REDUCED COGGING

(75) Inventors: Hiroshi Kaneshige, Tokyo (JP); Akie Tanaami, Tokyo (JP); Katsuya Fukushima, Tokyo (JP); Aiko Tagawa, Tokyo (JP)

(73) Assignee: THK CO., LTD., Shinagawa-ku (JP)

( * ) Notice: Subject to any disclaimer, the term of this patent is extended or adjusted under 35 U.S.C. 154(b) by 244 days.

(21) Appl. No.: 13/703,522

(22) PCT Filed: May 13, 2011

(86) PCT No.: PCT/JP2011/061081
§ 371 (c)(1),
(2), (4) Date: Dec. 11, 2012

(87) PCT Pub. No.: WO2011/158583
PCT Pub. Date: Dec. 22, 2011

(65) Prior Publication Data
US 2013/0082544 A1   Apr. 4, 2013

(30) Foreign Application Priority Data
Jun. 16, 2010   (JP) ................................. 2010-137400

(51) Int. Cl.
*H02K 3/00* (2006.01)
*H02K 41/03* (2006.01)
(Continued)

(52) U.S. Cl.
CPC .............. *H02K 41/033* (2013.01); *H02K 3/00* (2013.01); *H02K 41/031* (2013.01); *H02K 1/14* (2013.01); *H02K 7/08* (2013.01); *H02K 29/03* (2013.01); *H02K 2213/03* (2013.01)

(58) Field of Classification Search
CPC ........ H02K 3/00; H02K 41/031; H02K 7/00; H02K 7/08; H02K 1/00; H02K 1/14; H02K 29/00; H02K 29/03; H02K 2213/03; H02K 41/033
USPC ....... 310/216.069, 208, 12.24, 216.112, 155, 310/12.09, 14, 216.097, 49.01, 12.01–12.33
See application file for complete search history.

(56) References Cited

U.S. PATENT DOCUMENTS 4,545,117 A * 10/1985 Okamoto ........................ 29/596
4,665,329 A *  5/1987 Raschbichler ................. 310/13
(Continued)

FOREIGN PATENT DOCUMENTS

CN   101611530 A   12/2009
JP   07-053427 Y2  12/1995
(Continued)

OTHER PUBLICATIONS

Rajagopal, K. R., B. Singh, and B. P. Singh. "Optimal Tooth-Geometry for Specific Performance." IEEE Xplore. IEEE Transactions on Magnetics, vol. 39, No. 5, Sep. 2003. Web. Nov. 7, 2014.*
(Continued)

*Primary Examiner* — Dang Le
(74) *Attorney, Agent, or Firm* — Westerman, Hattori, Daniels & Adrian, LLP

(57) ABSTRACT

Provided is a linear motor capable of preventing an increase in length of the armature in the moving direction and also of reducing cogging. The linear motor has a magnetic field part having a plurality of permanent magnets arranged in a straight line in such a manner that N poles and S poles are formed alternately; and an armature having a core which has a plurality of teeth arranged opposite to the magnetic field part with a gap created therebetween and a plurality of coils wound on the teeth of the core. Among the teeth with the coils wound around, a width TW1 in a relative moving direction of each of teeth placed at both ends in the relative moving direction of the armature is smaller, from a base part to an end part thereof, than a width TW2 in the relative moving direction of each of other teeth.

2 Claims, 17 Drawing Sheets end tooth width: 8.5mm, 9.5mm    normal tooth width: 9.5mm    end tooth width: 8.5mm, 9.5mm

(51) Int. Cl.
*H02K 7/08* (2006.01)
*H02K 29/03* (2006.01)
*H02K 1/14* (2006.01)

(56) References Cited

U.S. PATENT DOCUMENTS

| | | | |
|---|---|---|---|
| 4,695,777 A * | 9/1987 | Asano | 318/130 |
| 4,728,382 A * | 3/1988 | Raschbichler | 156/264 |
| 4,731,569 A * | 3/1988 | Bohn | 318/687 |
| 6,242,822 B1 * | 6/2001 | Strothmann | H02K 29/03 310/12.19 |
| 6,476,524 B1 * | 11/2002 | Miyamoto et al. | 310/12.19 |
| 6,831,379 B2 * | 12/2004 | Ohto et al. | 310/12.18 |
| 6,949,846 B2 * | 9/2005 | Sugita et al. | 310/12.15 |
| 7,170,202 B2 * | 1/2007 | Watarai et al. | 310/12.25 |
| 2004/0256919 A1 * | 12/2004 | Hashimoto et al. | 310/12 |
| 2008/0129125 A1 * | 6/2008 | Pagani | 310/12 |
| 2008/0174185 A1 | 7/2008 | Giovanardi | |
| 2009/0127939 A1 * | 5/2009 | Kaneshige et al. | 310/12 |
| 2009/0322162 A1 * | 12/2009 | Jajtic | H02K 41/031 310/12.24 |

FOREIGN PATENT DOCUMENTS

| | | |
|---|---|---|
| JP | 09-037540 A | 2/1997 |
| JP | 10-042496 A | 2/1998 |
| JP | 2005-168243 A | 6/2005 |
| WO | 2009/035050 A1 | 3/2009 |

OTHER PUBLICATIONS

International Search Report of PCT/JP2011/061081, mailing date of Aug. 9, 2011.
Chinese Office Action dated Mar. 20, 2015, issued in corresponding CN Patent Application No. 201180028790.9 with English translation (10 pages).

* cited by examiner

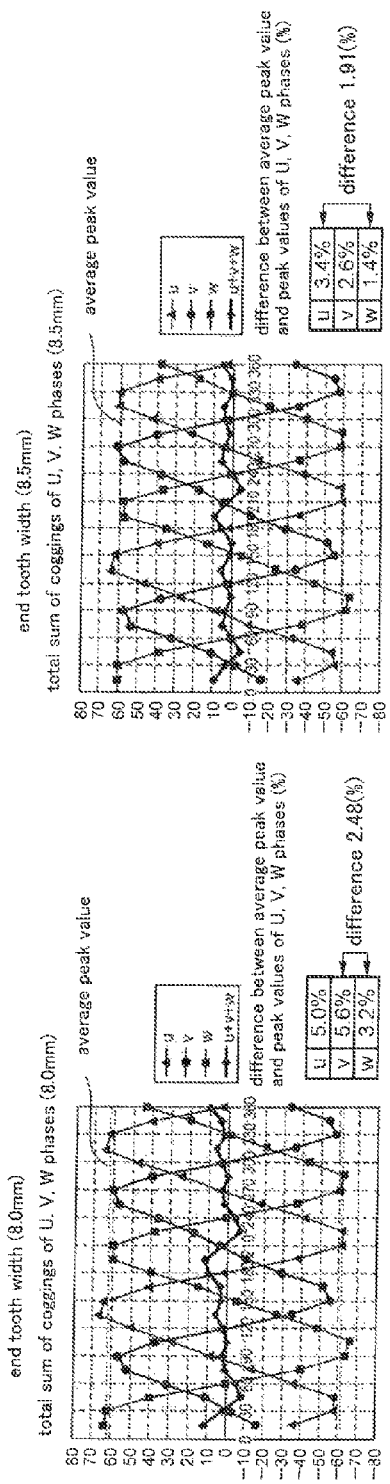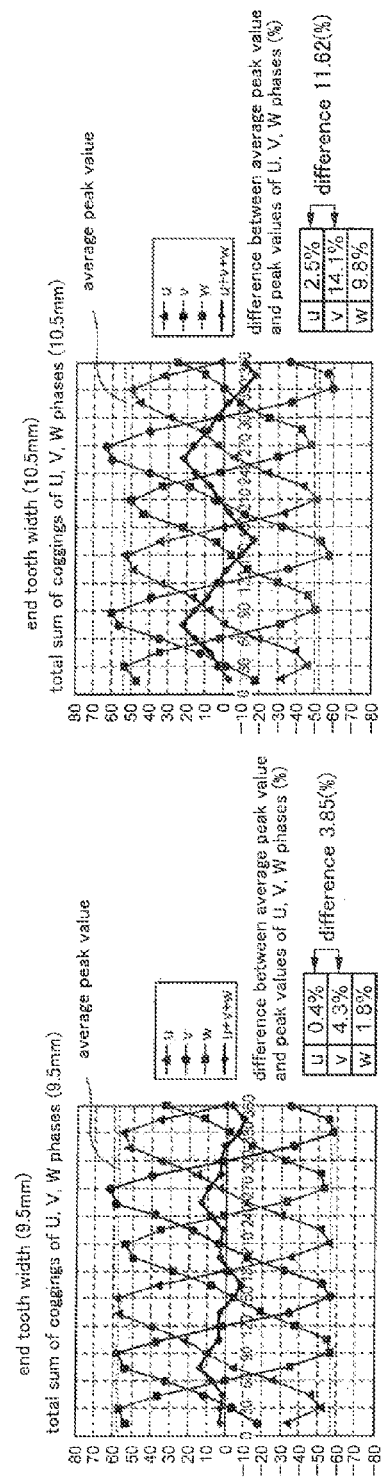

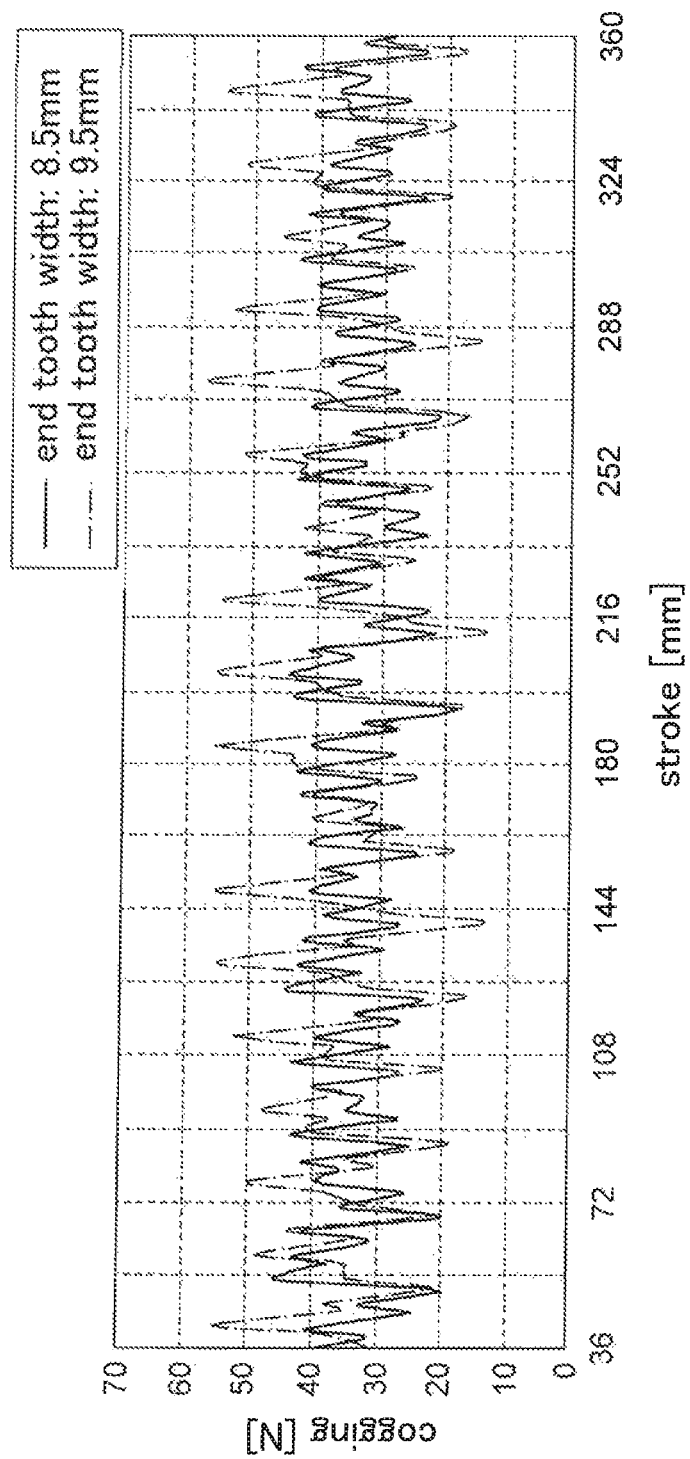

LINEAR MOTOR WITH REDUCED COGGING

TECHNICAL FIELD

The present invention relates to a linear motor which has a magnetic field part and an armature linearly moving relative to the magnetic field part. Particularly, the present invention relates to a linear motor capable of reducing cogging.

BACKGROUND ART

The linear motor has a magnetic field part having a plurality of permanent magnets and an armature arranged in an opposite manner on the magnetic field part with a gap created therebetween. In the magnetic field part, the permanent magnets are arranged in a straight line in such a manner the N poles and S poles are formed alternately. The armature has a core having a plurality of teeth opposing to the permanent magnets of the magnetic field part and a plurality of coils wound on the respective teeth. When alternate current is made to pass through the phase coils wound on the respective teeth, there occurs a moving magnetic field. This moving magnetic field and the magnetic field of the permanent magnets interact with each other, which generates a thrust so that the armature linearly moves relative to the magnetic field part.

In a linear motor that moves linearly, the length of the armature is limited in the moving direction, while the armature of a rotary motor is formed endless. Therefore, when the armature moves relative to the magnetic field part, there likely occurs cogging. Cogging is a phenomenon of magnetic forces between the core of the armature and permanent magnets pulses depending on the electrical angle.

Generally, the core is made of a magnetic material. When current does not flow into the coil, the magnetic attraction force is generated between the teeth of the core and the permanent magnets. When the armature moves relative to the magnetic field part, the teeth of the core are attracted by permanent magnet in front or retracted by permanent magnet in the rear. This is considered to cause such a cogging that the magnetic attraction force applied to the armature varies periodically in every magnetic pole pitch of the permanent magnets. When the current is passed through the coils, the cogging remains and acts as external disturbance.

In a conventional art, there are known auxiliary magnetic poles provided at both ends of the core of the armature in the moving direction in order to cancel the cogging (see the patent literature 1). On each of the auxiliary magnetic poles at both ends, no coil is wound. The distance between the auxiliary magnetic poles at both ends is set to such a distance that magnetic attraction forces generated at the respective ends cancel each other.

CITATION LIST

Patent Literature

Patent Literature 1: Japanese Examined Utility Model Application Publication No. 7-53427

SUMMARY OF INVENTION

Technical Problem

However, in the linear motor disclosed in the patent literature 1, as auxiliary magnetic poles are provided in pair at both ends of the core of the armature in the moving direction, the length of the armature in the moving direction is problematically increased.

Then, the present invention aims to provide a linear motor of new structure capable of reducing cogging.

Solution to Problem

In order to solve the above-mentioned problem, one aspect of the present invention is a linear motor comprising: a magnetic field part having a plurality of permanent magnets arranged in a straight line in such a manner that N poles and S poles are formed alternately; and an armature having a core which has a plurality of teeth arranged opposite to the magnetic field part with a gap created therebetween and a plurality of coils wound on the teeth of the core, the armature linearly moving relative to the magnetic field part, wherein among the teeth with the coils wound around, a width in a relative moving direction of each of teeth placed at both ends in the relative moving direction is smaller, from a base part to an end part thereof, than a width in the relative moving direction of each of other teeth.

Advantageous Effects of Invention

According to the present invention, as the width of each of the teeth placed at both ends of the armature in the relative moving direction is smaller, from its base part to its end part, than the width in the relative moving direction of each of the other teeth, it is possible to reduce variation in magnetic attraction forces generated in a sinusoidal wave manner in the U-phase, V-phase and W-phase teeth. Therefore, it is possible to reduce the cogging as a total sum of magnetic attraction forces generated in a sinusoidal wave manner in the U-phase, V-phase and W-phase teeth.

BRIEF DESCRIPTION OF DRAWINGS

FIG. 11 provides graphs showing fluctuation of cogging disassembled into U, V and W phases (FIG. 11(a) shows cogging of the teeth width 8 mm, FIG. 11(b) shows cogging of the teeth width 8.5 mm, FIG. 11(c) shows cogging of the teeth width 9.5 mm and FIG. 11(d) shows cogging of the teeth width 10.5 mm);

FIG. 19 is a graph showing relationship between the stroke of the armature and cogging.

DESCRIPTION OF EMBODIMENTS

Figure 1:
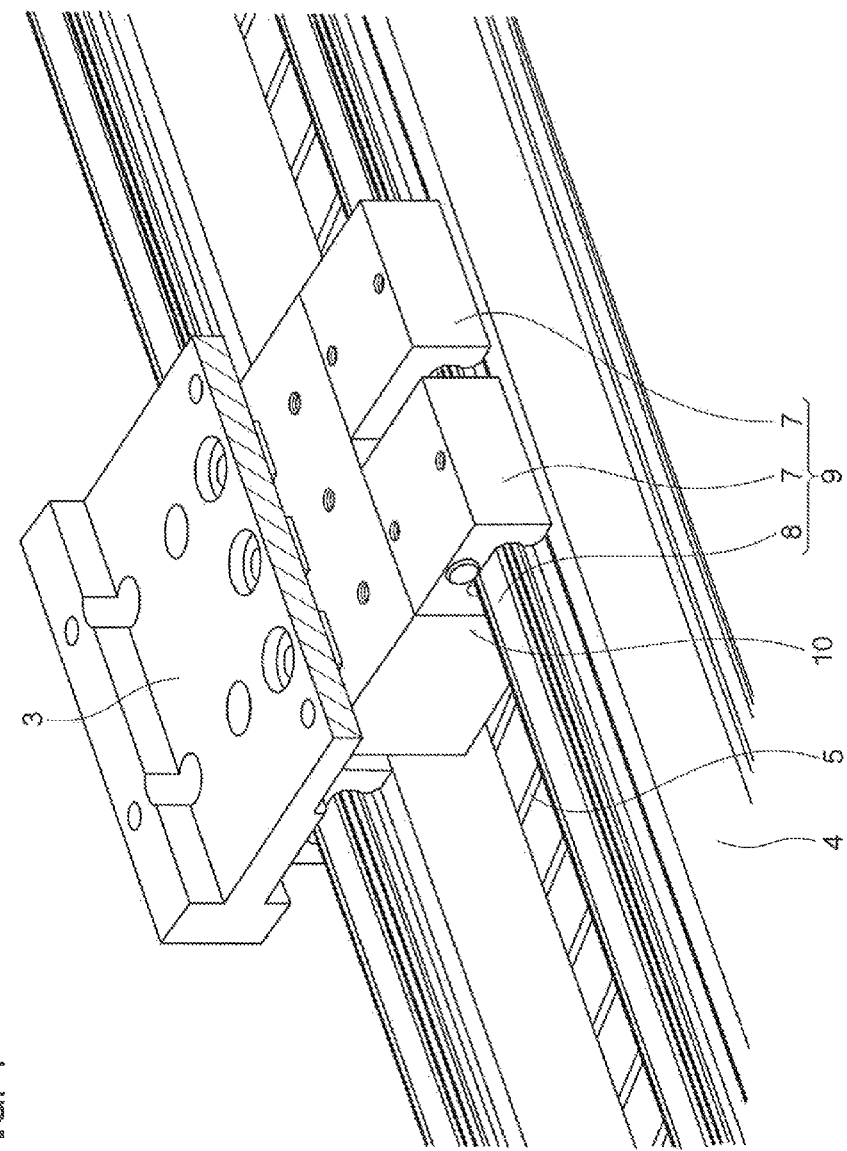
FIG. 1 is a perspective view of a linear motor according to one embodiment of the present invention (including a partial cross sectional view of a table)
Figure 2:
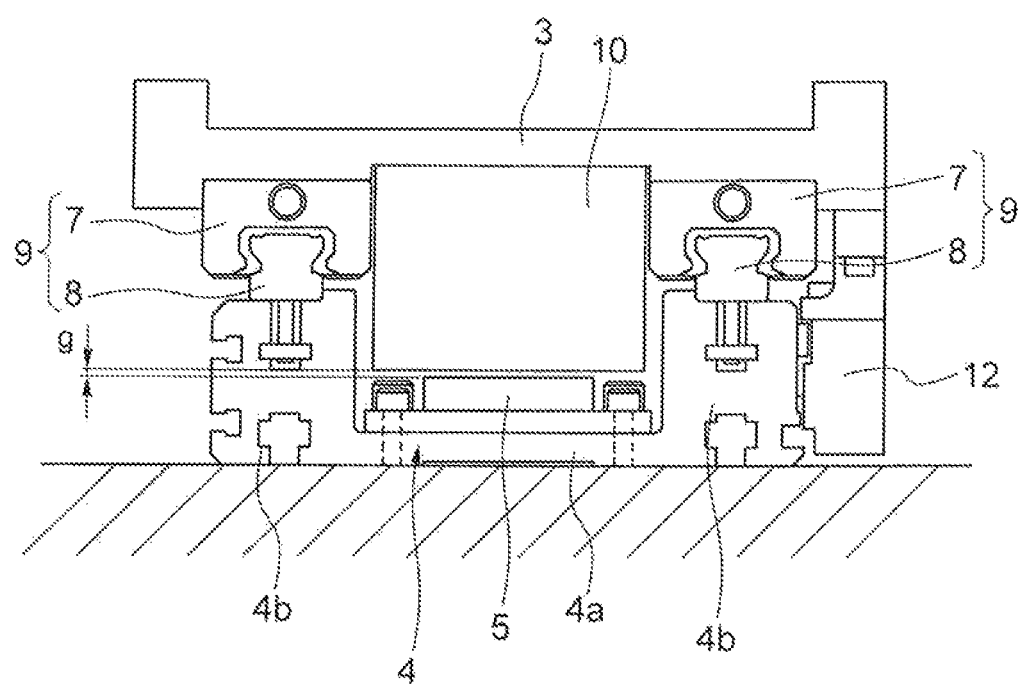
FIG. 2 is a front view of the linear motor.

With reference to the accompanying drawings, an embodiment of the present invention will be described in detail below. FIGS. 1 and 2 are views illustrating an overall structure of the linear motor. In the drawings, same components are denoted by same reference numerals.

On a base 4 elongated in a narrow shape, a magnetic field part 5 of the linear motor is mounted. The magnetic field part 5 is placed opposite to an armature 10 with a predetermined gap created therebetween. In this embodiment, the armature 10 is mounted on the under surface of a table 3 and moves linearly in the longitudinal direction of the base 4, together with the table 3.

On the base 4, there is mounted a linear guide 9 for guiding linear movement of the table 3. The table 3 is mounted on the upper surfaces of moving blocks 7 of the linear guide 9. The armature 10 is provided between left and right linear guides 9 on the under surface of the table 3. The armature 10 is mounted on the table 3 with use of a fastening member such as a bolt or screw.

As illustrated in the front view of FIG. 2, the gap g is created between the armature 10 and the magnetic field part 5. The linear guide 9 guides linear movement of the table 3 while holding the gap g constant.

The base 4 has a bottom wall part 4a and a pair of side wall parts 4b provided at respective sides of the bottom wall part 4a in the width direction. On an upper surface of the bottom wall part 4a, the magnetic field part 5 is mounted. On upper surfaces of the side wall parts 4a, raceway rails 8 of the linear guides 9 are mounted, respectively. On each of the raceway rails 8, moving blocks 7 are mounted slidable. Between the raceway rail 8 and each moving block 7, a plurality of balls is provided rollable. In each moving block 7, a circuitry ball circulation path is formed for circulating the balls. When the moving block 7 moves linearly relative to the raceway rail 8, the balls circulate in the circuitry ball circulation path.

The table 3 is made of, for example, a nonmagnetic material such as aluminum. On the table 3, position detecting means 12 such as a linear scale is provided for detecting the position of the table 3 relative to the base 4. A position signal detected by the position detecting means 12 is sent to a driver (not shown) for driving the linear motor. The driver controls current to supply to the armature 10 so that the table 3 can move in accordance with a position command from a higher controller.

FIG. 3 provides detailed views of the armature 10 mounted on the under surface of the table. The armature 10 has a core 14 made of a magnetic material such as silicon steel or electromagnetic steel and a plurality of coils 16 wound on a plurality of teeth 14a of the core 14.

The core 14 has aback yoke 14b formed with a square-shaped flat surface and the plural teeth 14a projecting toward the magnetic field part 5 from the back yoke 14b. Ends of the back yoke 14b in the moving direction hang over the respective end teeth 14a-1 in the moving direction outward in the moving direction. In the back yoke 14b, screw holes 14c are formed for mounting the core 14 onto the table 3.

Figure 3A:
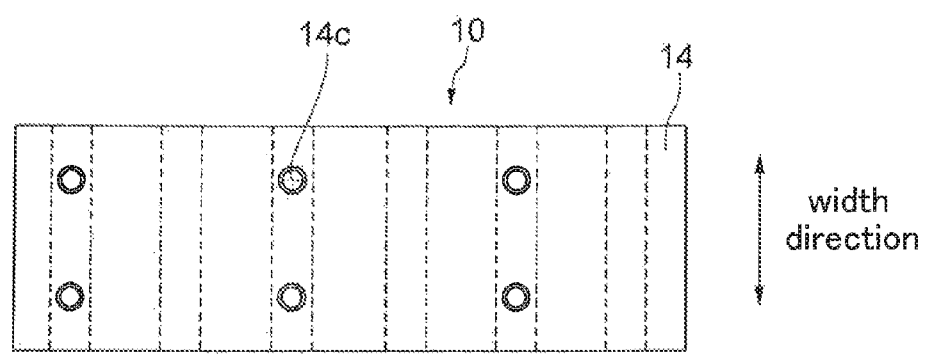
FIG. 3 provides views illustrating an armature of the linear motor (FIG. 3(a) is a plan view and FIG. 3(b) is a side view)
Figure 3B:
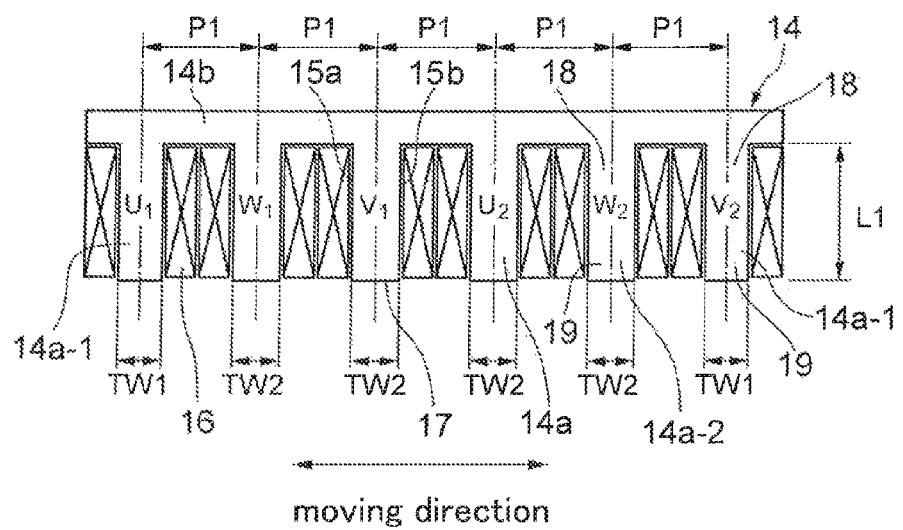

When seen in the plan view of FIG. 3(a), each of the teeth 14a is formed into a narrow plate elongated in the width direction. When seen in the side view of FIG. 3(b), each of the teeth 14a is formed into a narrow rectangular shape elongated in the vertical direction and juts in the direction orthogonal to the back yoke 14b. Side surfaces 15a and 15b in pair of each of the teeth 14a (end surfaces in the moving direction) are formed into flat surfaces and parallel to each other. The end surface 17 (under surface) of each of the teeth 14a is formed into a flat surface along the length in the moving direction and is orthogonal to the paired side surfaces 15a and 15b. The cross sectional shape of the core 14 along the moving direction is the same as the side surface shape of the core 14 and is held constant all over the width. The core 14 is formed by stacking thin steel plates in the width direction of the core 14, each thin steel plate having a thickness of less than 1 mm and being formed by press punching into the same shape as the ide surface.

The pitch P1 between teeth 14a (the distance between the centers in the moving direction of adjacent teeth 14a) is held equal all over the teeth 14a. Among the teeth 14a, the widths in the moving direction of the teeth 14a-1 positioned at the respective ends (end teeth 14a-1) in the moving direction are indicated by TW1 and equal to each other. The width of each of the end teeth 14a-1 positioned at both ends in the moving direction is held constant at TW1 from the base part 18 to the end part 19. As to the other teeth 14a-2, their widths in the moving direction are indicated by TW2 and equal to each other. The width of each of the teeth 14a-2 is held constant at TW2 from the base part 18 to the end part 19. The width TW1 of each of the end teeth 14a-1 at both ends is narrower than the width TW2 of each of the other teeth 14a-2, from the base part 18 to the end part 19. Specifically, the size of TW1 is set to 0.7×TW2≤TW1<TW2. The projection amounts L1 of the teeth 14a from the back yoke 14b are set to be equal to each other. Therefore, the gap from the end part of each of the end teeth 14a-1 positioned at both ends to the magnetic field part 5 is equal to the gap from the end part of each of the other teeth 14a-2 to the magnetic field part 5.

The number of teeth 14a is set to be a multiple of 3. In this example, the number of teeth 14a is 6, including two U-phase teeth, two V-phase teeth and two W-phase teeth. Teeth 14a are wound by the U-phase, V-phase and W-phase coils 16, respectively. In this example, each of the teeth 14a is wound by one-phase coil 16 in a concentrated way (concentrated winding). Winding of the coils 16 is not limited to concentrated winding, but may be distributed winding (lap winding). The wires of the coils 16 of U-phase, V-phase and W-phase are all equal in wire thickness and the number of turns to each other, and they are also equal in the total size. As described above, as the width of each of the end teeth 14a-1 positioned at both ends in the moving direction is smaller than the width of each of the other teeth 4a-2, the gap between the end teeth 14a-1 in the moving direction and the coils 16 becomes larger than the gap between the other teeth 14a-2 and the coils 16. The coils 16 of U-phase, V-phase and W-phase are wound around the teeth 14a, respectively, and then, the coils 16 are molded in resin. With this process, the coils 16 are fixed to the core 14.

Figure 4:
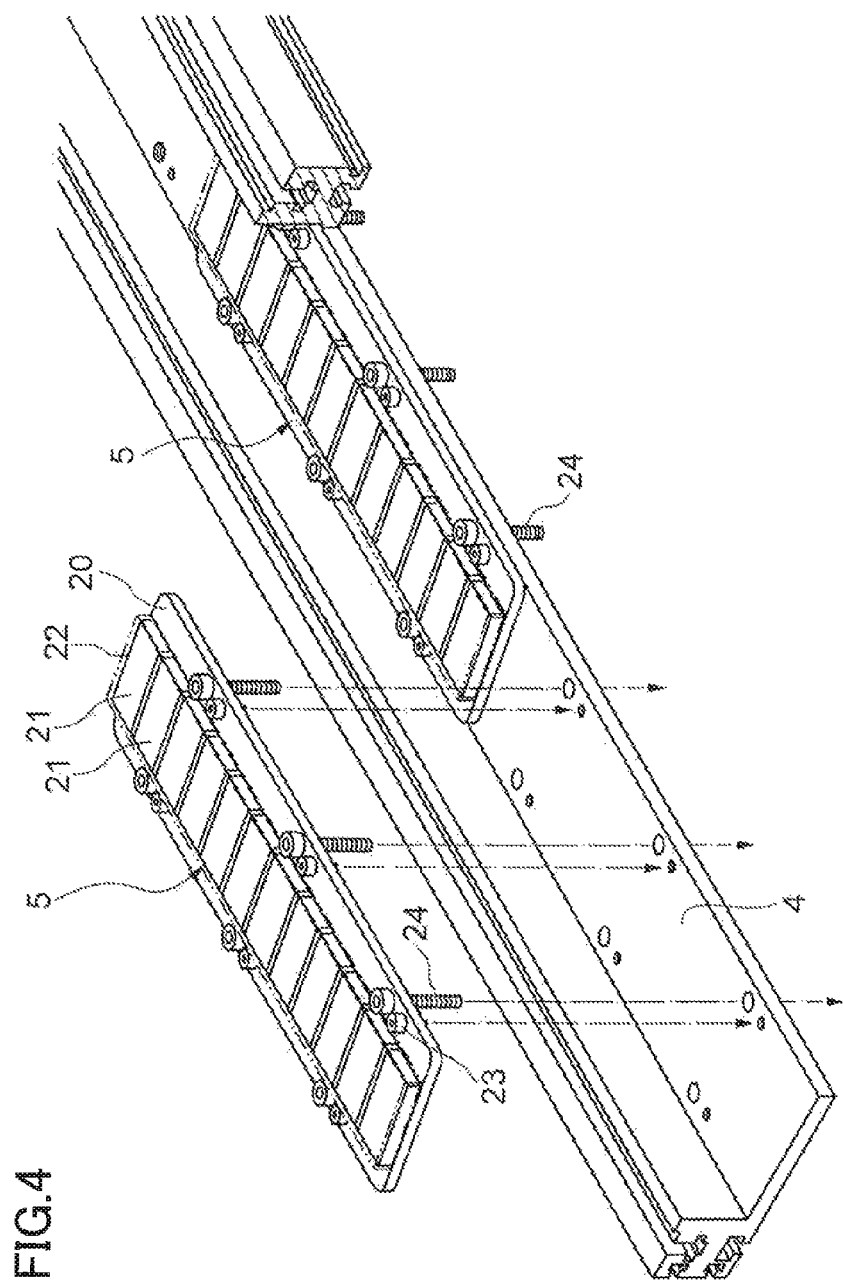
FIG. 4 is an exploded perspective view of a magnetic field part of the linear motor.

FIG. 4 illustrates the magnetic field part 5 mounted on the upper surface of the base 4. The magnetic field part 5 has a thin yoke 20 and a plurality of plate-shaped permanent magnets 21 aligned in a line in the moving direction of the armature on the upper surface of the yoke 20. The permanent magnets 21 are made of rare-earth magnets such as neodymium magnets having a higher coercive force. In each of the plate-shaped permanent magnets 21, one of the N pole and the S pole is formed on the front side thereof and the other is formed on the back side. The plate-shaped permanent magnets 21 are arranged in such a manner that the N poles and S poles are formed alternately n the longitudinal direction. The permanent magnets 21 are fixed to the yoke 20 by adhesion or the like. The permanent magnets 21 fixed to the yoke 20 is covered with a cover plate 22 made of a nonmagnetic material. The cover plate 22 is also fixed to the yoke 20 by adhesion or the like. The yoke 20 to which the permanent magnets 21 and the cover plate 22 are fixed is mounted onto the base 4 by a fastening member like a bolt 23. The magnetic field part 5 is unitized and a plurality of unitized magnetic field parts 5 are mounted on the base 4 in accordance with the length of the base 4. The reference numeral 24 denotes a bolt (fastening member) for mounting the base 4 onto another device.

Figure 5:
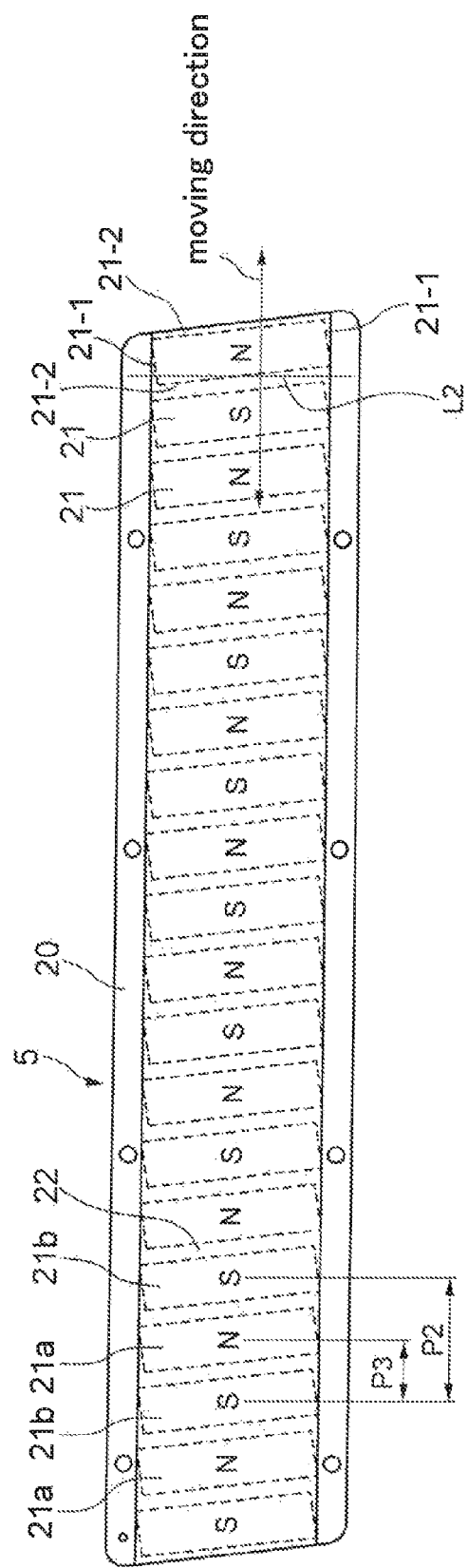
FIG. 5 is a plan view of the magnetic field part.

FIG. 5 is a plan view of the magnetic field part 5. In this example, the planer shape of each of the permanent magnets 21 is a rectangular and each permanent magnet is inclined relative to the moving direction of the armature 10. Paired end sides 21-2 of the permanent magnet 21 are parallel to each other and inclined by a predetermined angle relative to the line L2 orthogonal to the moving direction of the armature 10. Paired end sides 21-1 in the width direction of each permanent magnet 21 are parallel to each other and orthogonal to the end sides 21-2. The distance P2 between the center of one S pole permanent magnet 21a and the center of another adjacent S pole permanent magnet 21a is an S pole-to-S pole pitch and twice as long as the N pole-to-S pole pitch P3.

When the core 14 of the armature 10 moves relative to the magnetic field part 5, a magnetic attraction force acts between the teeth 14a of the core 14 and the permanent magnets 21. In this magnetic attraction force, a component in the moving direction of the armature 10 causes cogging. A component of the force orthogonal to the moving direction of the armature 10 (attraction force in the vertical direction) is received by the liner guide 9 and does not affect the cogging. The cogging fluctuates periodically for every magnetic pole pitch P2 of the magnetic field part 5.

The inventors have focused attention on the relationship between cogging the width of each of the end teeth 14a-1 in the moving direction of the armature 10. Then, they have calculated, by magnetic field analysis, a cogging force for each of various widths of the end tooth 14a-1. As a result, they have found that the cogging can be reduced by making the width of each end tooth 14a-1 smaller, from its base part 18 to its end part 19, than the width of each of the other teeth 14a-2 (see examples described later and FIGS. 9 and 13).

When the armature 10 is moved relative to the magnetic field part 5, there occurs a magnetic attraction force in each tooth 14a, the magnetic attraction force being sinusoidal for every magnetic pole pitch P2. The total sum of magnetic attraction forces generated in the teeth 14a becomes cogging of the armature 10. Here, description is made with the teeth divided into U-phase, V-phase and W-phase teeth 14a. When it is assumed that ideal magnetic attraction forces of equal peak values and 120-degree different phases act on the U-phase, V-phase and W-phase teeth 14a, respectively, the total sum of the magnetic attraction forces act on the U-phase, V-phase and W-phase teeth 14a becomes zero, and there is to occur no cogging.

As the width of each of the end teeth 14a-1 is smaller like in this embodiment, the magnetic attraction forces on U-phase, V-phase and W-phase teeth are made closer to the ideal magnetic attraction forces of equal peak values and 120-degree different phases. With this configuration, it is expected that the cogging, which is the total sum of the magnetic attraction forces on the U-phase, V-phase and W-phase teeth 14a, is reduced (see examples described later and FIGS. 11 and 15)

However, as described above, if the width of each of the end teeth 14a-1 placed at both ends in the moving direction of the armature 10 is narrowed, the induced voltage of the coils 16 wound around the end teeth 14a-1 becomes small and the thrust of the linear motor is reduced accordingly. This reduction in induced voltage can be prevented by forming the end surface of each of the end teeth 14a-1 into a flat surface.

Figure 9:
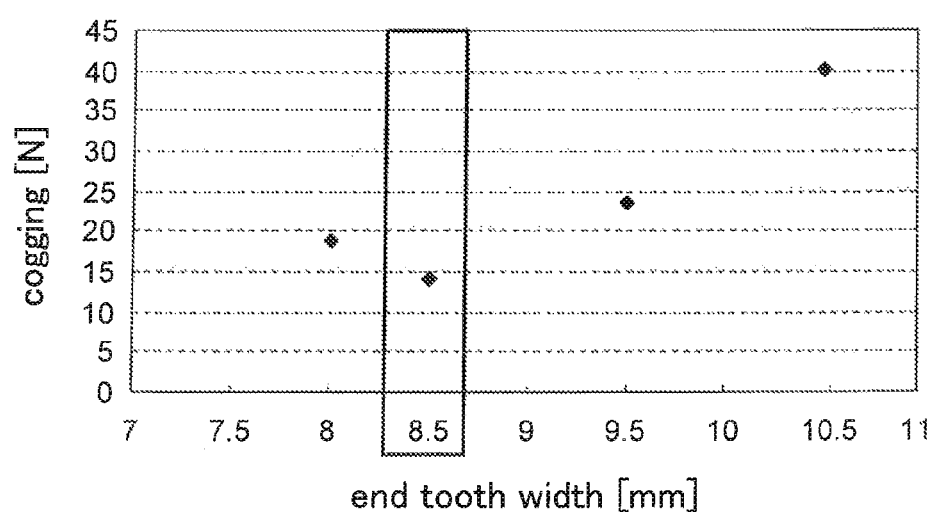
FIG. 9 is a graph showing relationship between the width of each of the teeth at both ends and cogging.

As illustrated in FIG. 9, as the width between the teeth 14a at both ends varies, the curve of cogging is shown as a valley, though details will be described later. That is, if the width of each tooth 14a is too small, the cogging is increased contrarily. If the width of each tooth 14a is further narrowed, the induced voltage of the coils 16 wound on the teeth 14a becomes small and the thrust of the liner motor is reduced accordingly. Therefore, the width of each end tooth 14a-1 is preferably 70% or more of the width of each of the other teeth 14a-2.

The present invention is not limited to the above-described embodiment and may be embodied in various forms without departing from the scope of the present invention.

For example, the structure of the linear motor is not limited to the above-mentioned structure in which the table is guided by the linear guides and may be modified as appropriate.

The linear movement of the armature relative to the magnetic field part is relative movement, and it may be configured that the magnetic field part moves and the armature is fixed.

Figure 6:
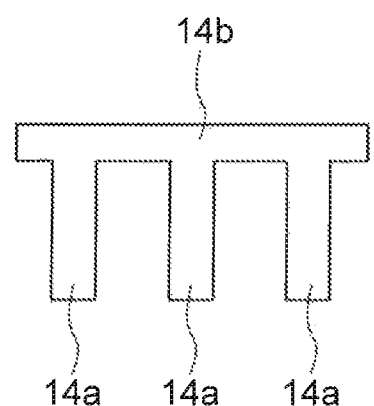
FIG. 6 is a side view illustrating another example of the core.

As illustrated in FIG. 6, the number of teeth 14a may be 3 or may be any number such as 9, 12, 15 or the like. And the three-phase coils may be replaced with two-phase coils. In such a case, the number of teeth is set to 4, 6, 8 or the like.

Figure 7:
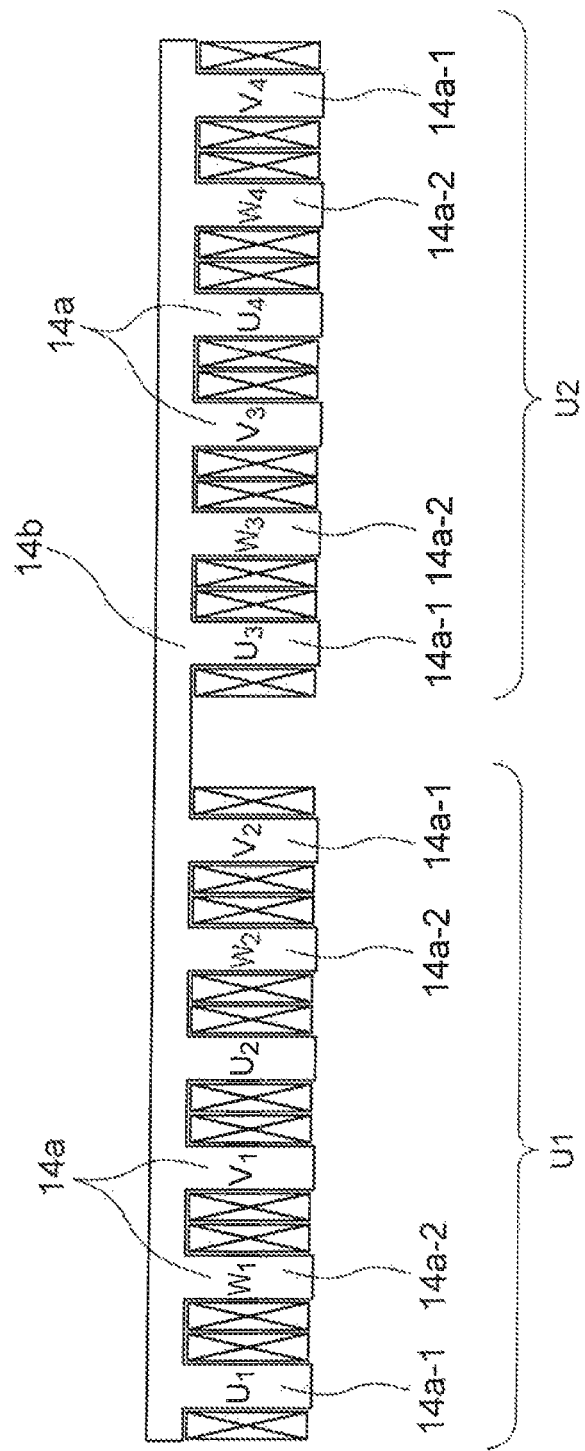
FIG. 7 is a side view of still another example of the core.

As illustrated in FIG. 7, one teeth unit is made of six teeth 14a and such teeth units (U1 and U2) are provided two or more in the longitudinal direction of the back yoke 14b. In this case, in each of the teeth units U1, U2 of equal pitch between teeth 14a, the width of each of the end teeth 14a-1 only needs to be smaller than the width of each of the other teeth 14a-2.

The back yoke and the teeth may not be formed into one piece but may be formed as separate members. After the coils are wound on the teeth, the teeth may be connected to the back yoke by fitting.

As the cogging can be reduced by narrowing the width of each of the end teeth, no auxiliary core is required. However, in order to further reduce the cogging, auxiliary cores with no coil wound on may be provided at both ends in the moving direction of the core.

EXAMPLE 1

Figure 8:
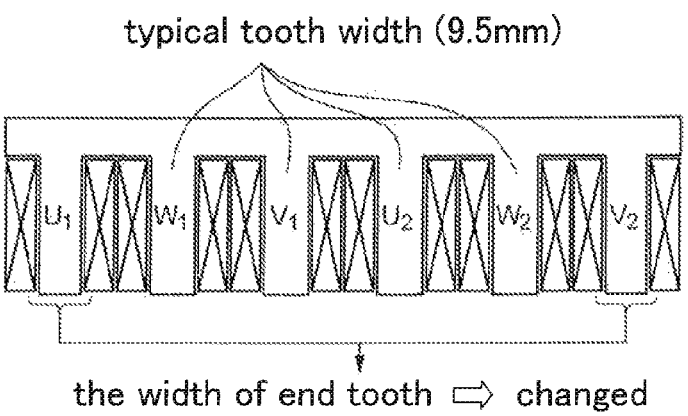
FIG. 8 is a side view illustrating a model of the core used in magnetic field analysis.

By the magnetic field analysis, the cogging was calculated for various widths of the end tooth. As an analysis model, a core with six teeth was used as illustrated in FIG. 8. The teeth were composed of two U-phase teeth, two V-phase teeth and two W-phase teeth. The width of each end tooth was changed from 8 mm, 8.5 mm, 9.5 mm and to 10.5 mm and the width of each of the other teeth was fixed to 9.5 mm.

As shown in FIG. 9, when the width of each end tooth is narrowed to 8.5 mm, the cogging is most reduced. When the tooth width is 8 mm, the cogging is smaller than that of the width of 9.5 mm, but is larger than that of the width of 8.5 mm. When the tooth width is 9.5 mm or more, the cogging tends to be increased.

Figure 10:
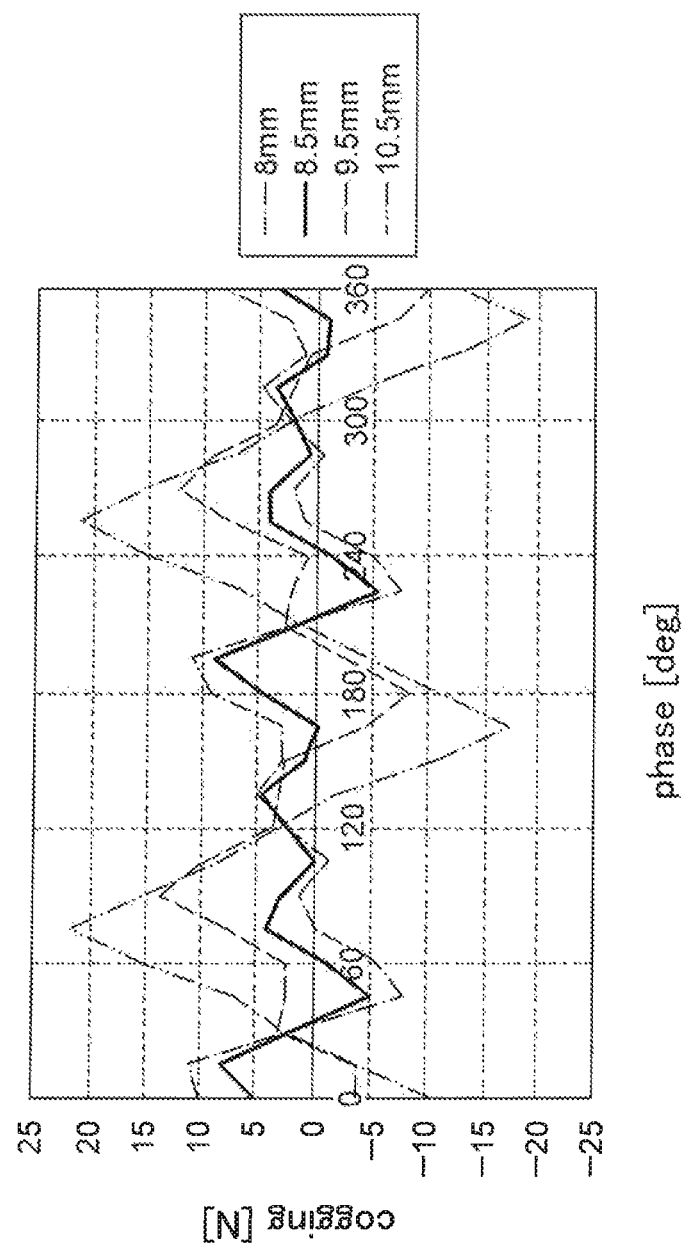
FIG. 10 is a graph showing relationship between the phase of the electric angle and cogging.

FIG. 10 illustrates changes in cogging when the armature is moved by 360-degree electrical angle (one magnetic pole pitch of the magnetic field part 5). The maximum values of the cogging forces of respective widths are expressed as the cogging forces in FIG. 9. When the width of each end tooth is 8.5 mm, the cogging becomes lowest throughout almost all of the electrical angles.

FIG. 11 shows the total cogging of each width in FIG. 10 is decomposed into U-phase, V-phase and W-phase cogging forces (magnetic attraction forces). Conversely, when the U-phase, V-phase and W-phase cogging forces (magnetic attraction forces) shown in FIG. 11 are added together, the cogging as shown in the graph of FIG. 10 is obtained. FIG. 11 shows four graphs corresponding to the widths of end tooth of 8 mm, 8.5 mm, 9.5 mm and 10.5 mm.

In FIG. 11, comparison is made about variations in peak values of the decomposed U-phase, V-phase and W-phase cogging forces (magnetic attraction forces) for respective tooth widths. Variation in peak value is a difference (%) between an average peak value shown by dotted line in FIG. 11 and the peak value of each phase. When the tooth width is 8 mm, the V-phase variation is largest to 5.6%, and the W-phase variation is smallest to 3.2%. A difference between V and W phases is 2.48%. When the tooth width is 8.5 mm, a difference between the U phase of largest variation and W phase of smallest variation is 1.91%. When the tooth width is 9.5 mm, a difference between the V phase of largest variation and the U phase of smallest variation is 3.85%. When the tooth width is 10.5 mm, a difference between the V phase of largest variation and the U phase of smallest variation is 11.62%.

As illustrated in the graph of FIG. 11, when the width of each end tooth is 8.5 mm, the U-phase, V-phase and W-phase cogging forces (magnetic attraction forces) can be made closer to ideal sinusoidal waves of equal peak values and 120-degree different phases. With this, it is expected that the total cogging as the total sum of U-phase, V-phase and W-phase cogging forces (magnetic attraction forces) is reduced.

EXAMPLE 2

Figure 12:
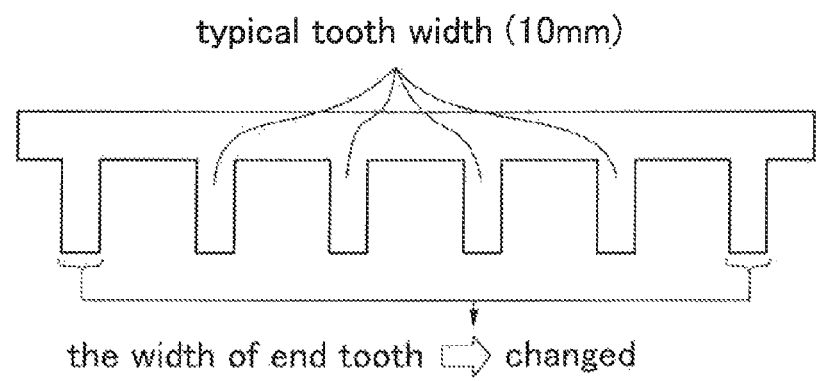
FIG. 12 is a side view illustrating another model of the core used in the magnetic field analysis.

The magnetic field analysis was performed on another linear motor which was different from the linear motor of the example 1. The linear motor of the example 2 was different from that of the example 1 in vertical and horizontal sizes of each plate-shaped magnet of the magnetic field part, inclined angle and shape of the core of the armature. FIG. 12 illustrates the core of the armature used in the magnetic field analysis. The width of each of the central four teeth is set to 10 mm and the width of each end tooth is changed from 8.5 mm, 9 mm, 9.5 mm, 10 mm and to 11 mm.

Figure 13:
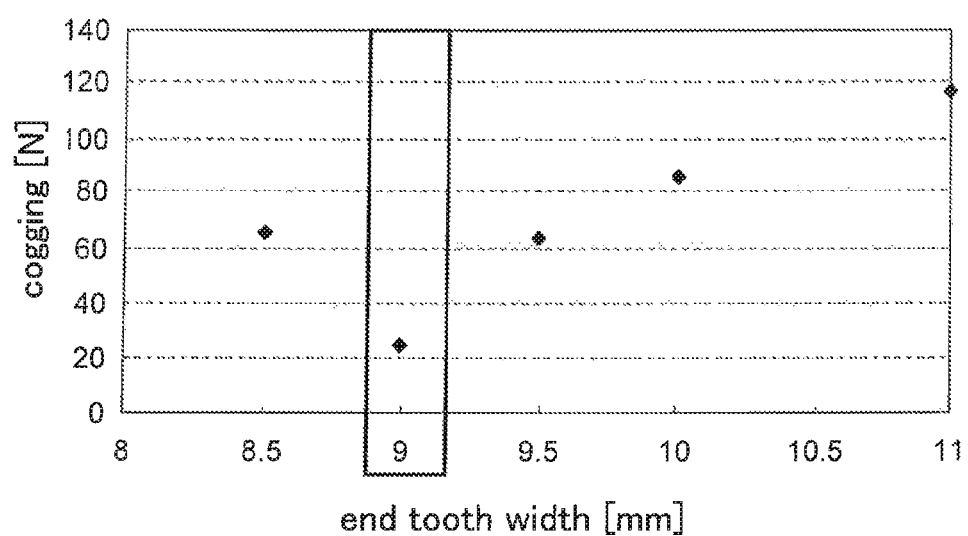
FIG. 13 is a graph showing relationship between the width of each of the teeth at both ends and cogging.

FIG. 13 illustrates the relationship between the width of the end tooth and cogging. When the tooth width is 9 mm, the cogging is lowest. When the tooth width is narrowed to 8.5 mm, the cogging becomes smaller than that of the width of 10 mm, but the cogging is larger than that of the width of 9 mm. The cogging curve is shown like a valley.

Figure 14:
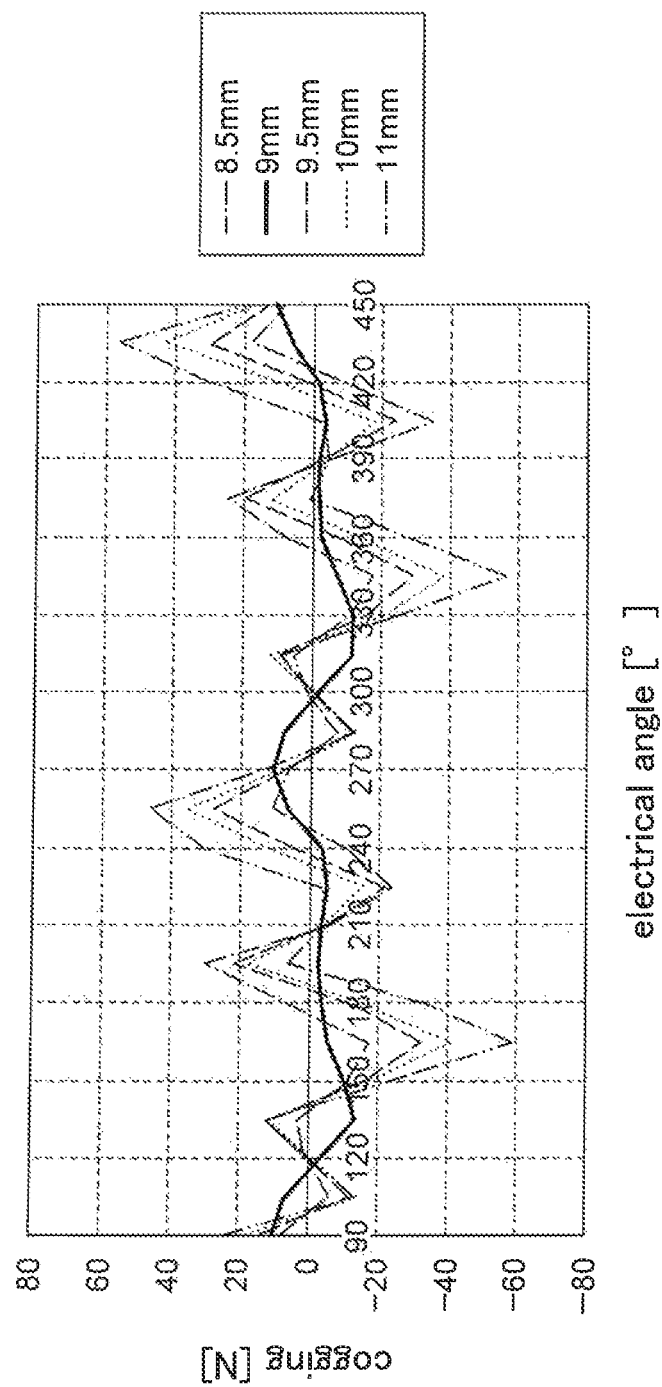
FIG. 14 is a graph showing the phase of the electric angle and cogging.
Figure 15A:
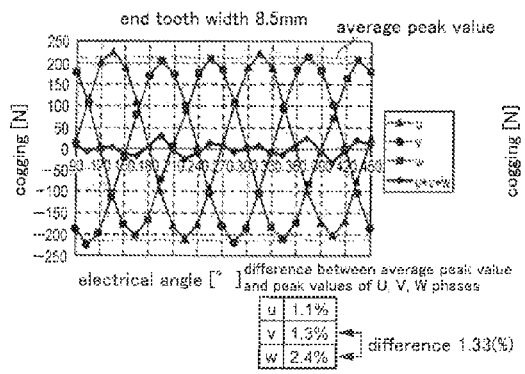
FIG. 15 provides graphs showing fluctuation of cogging disassembled into U, V and W phases (FIG. 15(a) shows cogging of the teeth width 8.5 mm, FIG. 15(b) shows cogging of the teeth width 9 mm, FIG. 15(c) shows cogging of the teeth width 9.5 mm, FIG. 15(d) shows cogging of the teeth width 10 mm and FIG. 15(e) shows cogging of the teeth width 11 mm)
Figure 15B:
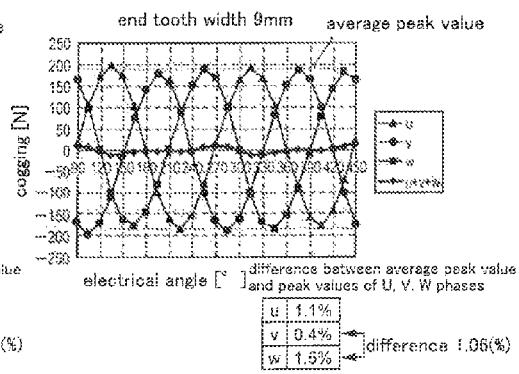
Figure 15C:
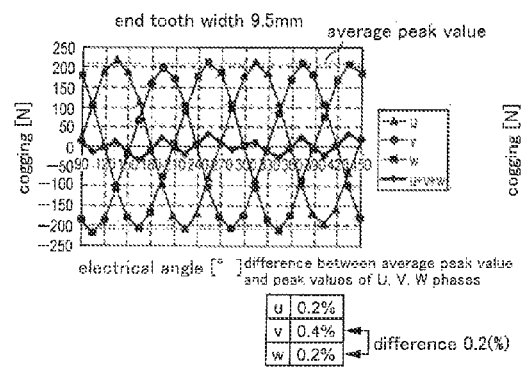
Figure 15D:
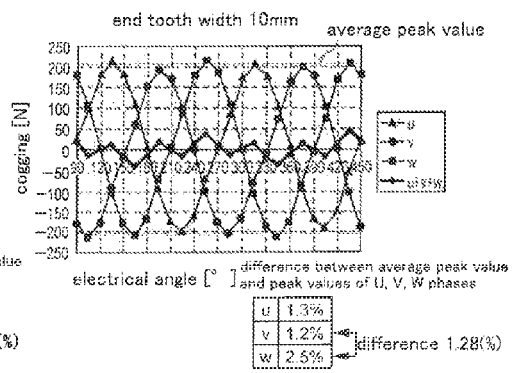
Figure 15E:
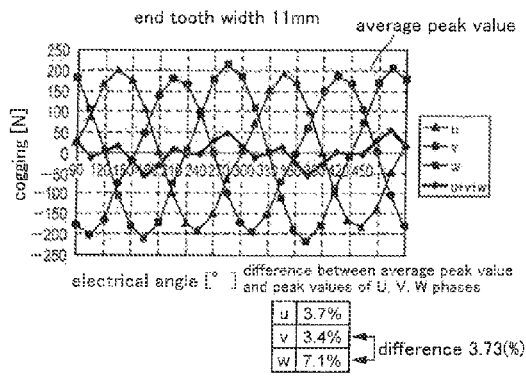

FIG. 14 illustrates changes in cogging forces when the armature is moved by 360-degree electrical angle. When the width of each end tooth is 9 mm, the cogging can be reduced in a most stable manner throughout the 360-degree electrical angle.

FIG. 15 illustrates comparison in variation of peak value of each of U-phase, V-phase and W-phase cogging forces (magnetic attraction forces) for respective tooth widths, the U-phase, V-phase and W-phase cogging forces being obtained by decomposing the cogging of each width in FIG. 14 into U-phase, V-phase and W-phase cogging forces (magnetic attraction forces). In this example, when the tooth width is 9.5, the variation in peak value becomes smallest. When not only the peak value but also the whole of the sinusoidal wave are considered, the variation becomes smallest when the tooth width is 9 mm.

EXAMPLE 3

Figure 16:
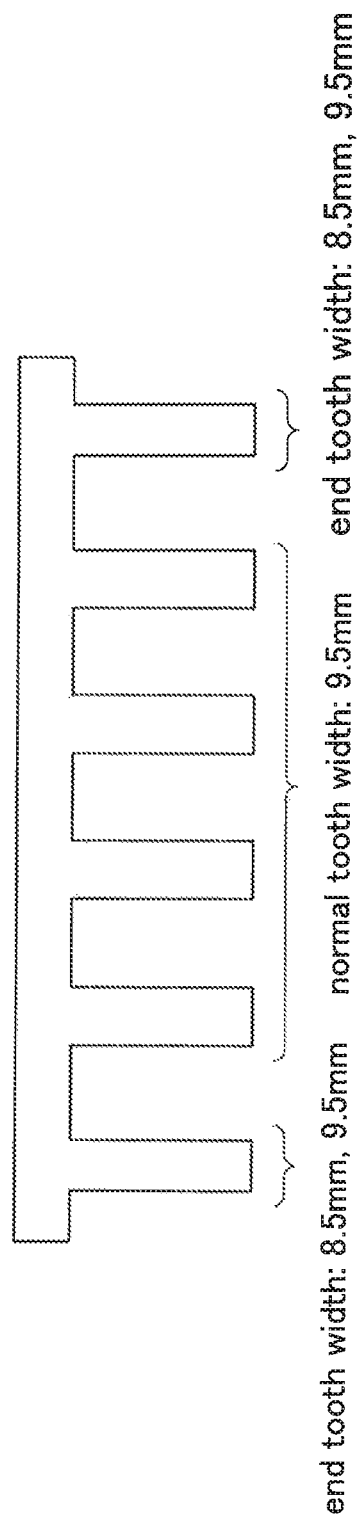
FIG. 16 is a side view illustrating a core of the armature used in an experiment.
Figure 17:
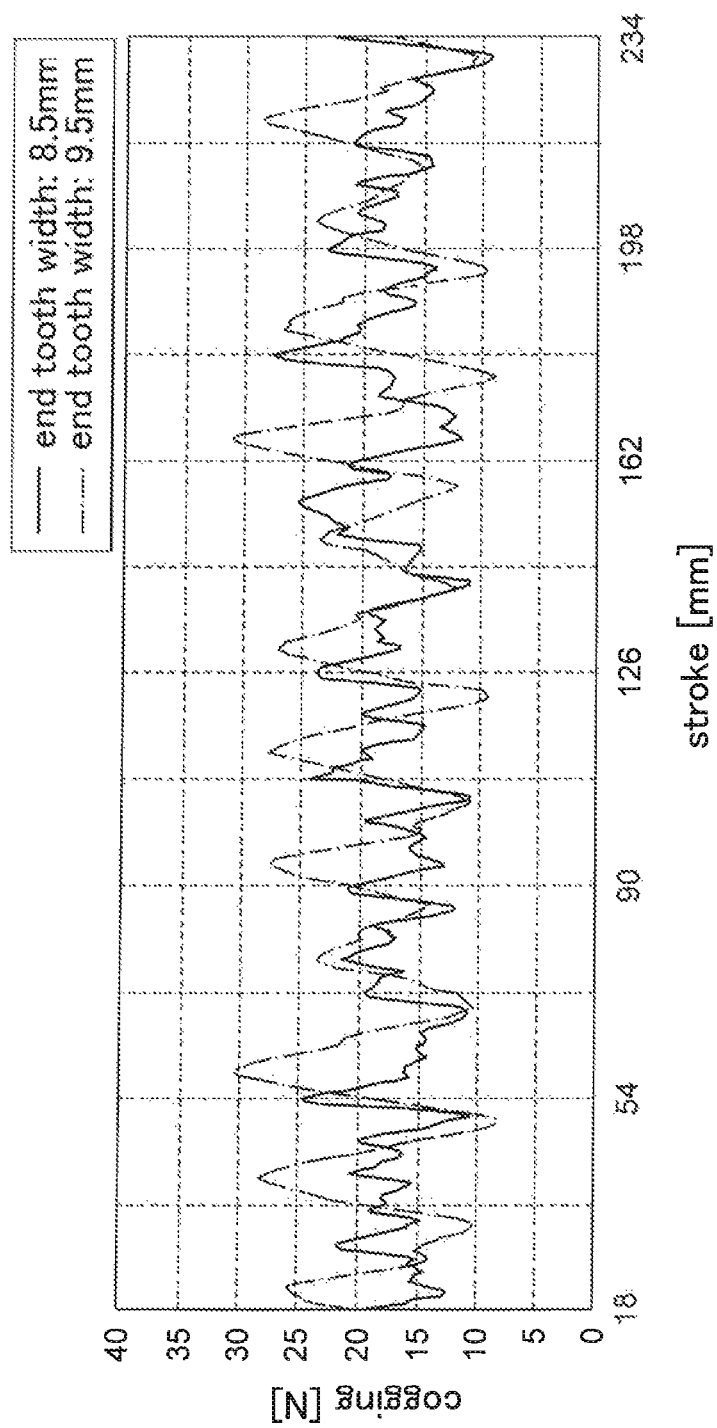
FIG. 17 is a graph showing relationship between the stroke of the armature and cogging.

The cogging of the linear motor was measured by experiment. The armature is travelled actually, and the generated cogging was measured. In the experiment, the core illustrated in FIG. 16 was used. As illustrated in FIG. 16, the width of each of the central four teeth is 9.5 mm. As to the width of each end tooth used, the widths of 9.5 mm and 8.5 mm are employed. As illustrated in FIG. 17, when the width of each end tooth is 8.5 mm, the cogging can be reduced as compared with that when the width is 9.5 mm.

EXAMPLE 4

Figure 18:
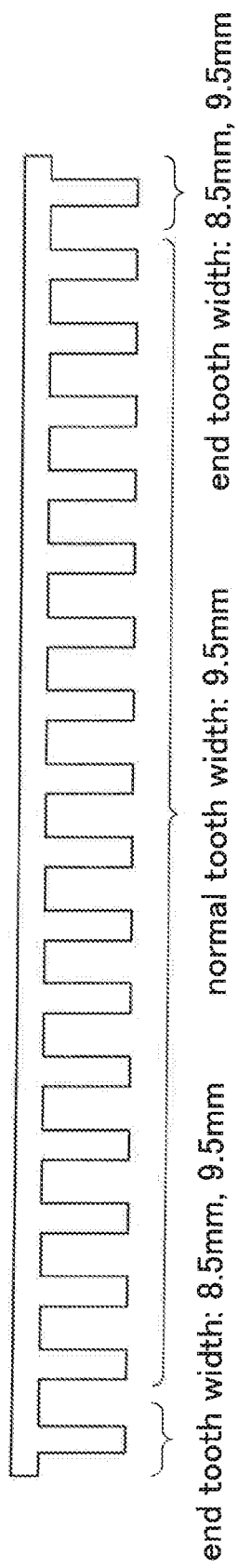
FIG. 18 is a side view illustrating another example of the core of the armature used in the experiment.

A linear motor other than the linear motor of the example 3 was used and the cogging was measured by experiment. In this linear motor, the number of teeth in the core is much larger than that of the core of the example 3. FIG. 18 illustrates the core used in the experiment. The width of each of central sixteen teeth is 9.5 mm. As to the width of each end tooth used, the widths of 9.5 mm and 8.5 mm are employed. As illustrated in FIG. 19, when the width of each end tooth is 8.5 mm, the cogging can be reduced as compared with that when the width is 9.5 mm.

The disclosure of Japanese Patent Application No. 2010-137400, filed on Jun. 16, 2010, including the specification, drawings, and abstract, is incorporated herein by reference in its entirety.

REFERENCE NUMERALS

5 . . . magnetic field part, 10 . . . armature, 14 . . . core, 14a . . . teeth, 14a-1 . . . end teeth, 14a-2 . . . other teeth, 16 . . . coil, 17 . . . end surface, 18 . . . base part, 19 . . . end part, 21 . . . permanent magnet, P1 . . . teeth center-to-center pitch (distance from the center of a tooth to the center of another tooth), TW1 . . . width of end tooth, TW2 . . . width of each of other teeth

The invention claimed is:
1. A linear motor comprising: a magnetic field part having a plurality of permanent magnets arranged in a straight line in such a manner that N poles and S poles are formed alternately; and an armature having a core which has a plurality of teeth arranged opposite to the magnetic field part with a gap created therebetween and U-phase, V-phase and W-phase coils wound on the plurality of teeth of the core, the armature linearly moving relative to the magnetic field part, wherein among the plurality of teeth with the U-phase, V-phase and W-phase coils of 120-degree different phases from each other directly wound around, a width in a relative moving direction of each of teeth placed at both ends in the relative moving direction is smaller, from a base part to an end part thereof, than a width in the relative moving direction of each of other teeth, wherein the coils of 120-degree phase difference are directly wound around the teeth placed at both ends, wherein the number of the plurality of teeth is set to be a multiple of three, the plurality of teeth including the teeth placed at the both ends and the other teeth, and the plurality of teeth being directly wound by the U-phase, V-phase and W-phase coils, and wherein all distances from centers of each of the plurality of teeth with the U-phase, V-phase and W-phase coils directly wound around to centers of respective adjacent teeth in the relative moving direction of the armature are equal to each other.

2. The linear motor of claim 1, wherein an end surface of each of the teeth placed at the both ends in the relative moving direction is formed flat.

\* \* \* \* \*